United States Patent [19]

Menzel

[11] 3,789,868
[45] Feb. 5, 1974

[54] FLUID OUTLET FOR PIPES
[75] Inventor: Otto C. Menzel, Torrens Park, Australia
[73] Assignee: Iplex Plastic Industries Pty. Ltd., Elizabeth, South Australia, Australia
[22] Filed: Dec. 3, 1971
[21] Appl. No.: 204,454

[52] U.S. Cl. .................................. 137/317, 73/212
[51] Int. Cl. ........................ B23b 41/08, F16e 41/04
[58] Field of Search .... 137/315, 317, 318; 285/162, 285/189, 192, 196; 16/2; 73/182, 212, 422

[56] References Cited
UNITED STATES PATENTS
| | | | |
|---|---|---|---|
| 1,145,860 | 7/1915 | Burnham | 73/212 |
| 1,869,962 | 8/1932 | Golden | 73/212 X |
| 2,057,645 | 10/1936 | Hamilton | 73/212 |
| 2,706,409 | 4/1955 | Preston | 73/212 |
| 2,888,028 | 5/1959 | Hill | 251/146 |
| 3,481,310 | 12/1969 | Alburger | 285/192 X |

*Primary Examiner*—Martin P. Schwadron
*Assistant Examiner*—David R. Matthews
*Attorney, Agent, or Firm*—Wofford, Felsman & Fails

[57] ABSTRACT

A fluid outlet for pipes which comprises an apertured grummet having a peripheral groove in the grummet engageable in an aperture in a pipe, and a nipple engageable through the aperture in the grummet to lock the grummet to the pipe and provide an opening from the pipe, a shoulder being provided optionally to engage the inner face of the grummet to prevent blowing out of the nipple under pressure. The grummet can be rotational and have a sloping inner end to effect flow control.

2 Claims, 4 Drawing Figures

PATENTED FEB 5 1974

3,789,868

FLUID OUTLET FOR PIPES

This invention relates to a fluid outlet for pipes.

BACKGROUND OF INVENTION

It is customary at present when laying pipes to carry water or the like particularly for reticulation to trees or the like on the drip system, to provide a number of outlets in a pipe from which water can be drawn.

This is at present achieved by cutting the pipe and inserting a "Tee" piece, or a tube is simply inserted through the wall of the pipe.

With the use of plastic pipes certain difficulties occur in providing these outlets, and the object of this invention is to provide an improved form of outlet which can be readily inserted in a plastic or other pipe and which will require a minimum of fixing and subsequent attention.

SUMMARY OF INVENTION

Basically the invention comprises the use of a resilient grummet which can be inserted into an aperture in the pipe and into which can then be pushed a nipple having a barbed or tapered end such that after it is pushed through the aperture of the grummet the nipple will be firmly held against displacement, a further feature which can be used if required being a bevelled inner end to the nipple so that the nipple can be positioned to have an opening facing the direction of flow of fluid through the pipe or can be otherwise positioned according to the flow through the nipple which is intended.

It will be realised that such a device can be constructed in a very simple manner because it is only necessary to form an aperture in the pipe of a required size so that a rubber or plastic or other resilient grummet can be positioned in the aperture, and the device then fitted.

Figure 2:
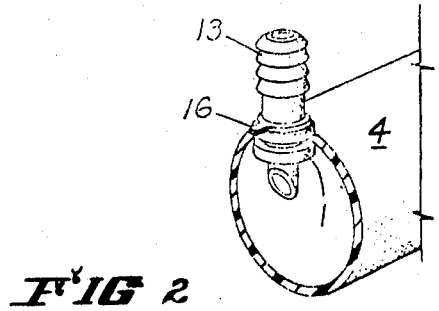
FIG. 2 shows the invention of FIG. 1 fitted to a pipe.
Figure 1:
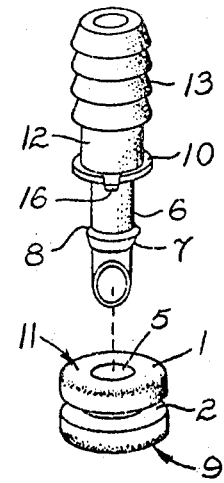
FIG. 1 is a perspective view of one form of the invention.
Figure 3:
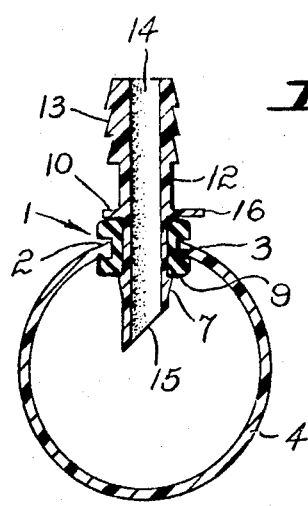
FIG. 3 is a central section through the invention fitted to a pipe.

Referring first to FIGS. 1, 2 and 3 the grummet 1 comprises a resilient member which has a peripheral groove 2 which allows the grummet 1 to be accommodated by pushing it partway through an aperture 3 in the pipe 4 until the groove 2 is engaged by the edges of the aperture 3 in the pipe 4 whereupon expansion of the grummet will locate the grummet in the aperture 3 of the pipe 4 but leaving a central hole 5 in the grummet free for the nipple 6 to be pushed into same, the size of the nipple 6 of course being such that as it is pushed through the grummet 1 it compresses the material of the grummet and holds the material in this compressed state, the nipple for this purpose being so arranged that when once inserted pressure of water or the like will not blow it out of the grummet which can as said be achieved by having the inner portion of the nipple 6, which is pushed through the grummet, either barbed or tapered as shown by 7 to provide a shoulder 8 which then engages the inner face 9 of the grummet and thus prevents easy withdrawal of the nipple 6 when once inserted.

A flange 10 on the nipple serves to engage the outer face 11 of the grummet so that the nipple cannot be pushed through too far, and as will be realised the nipple is provided with a projecting portion 12 onto which a hose can be fitted, this portion having external ridges 13 to provide a grip.

It will be obvious that the projecting portion 12 can have an external or internally threaded socket to take a correspondingly threaded member where a device such as a drip feed is to be joined to it.

The actual shape of the projecting portion outside of the grummet 1 is immateiral for the purposes of this invention but will be dictated by the requirements and the type of apparatus which is to be fixed to it, and of course the nipole 6 can include on it flow control means such as a tap or the like where this is required as the unit can be used anywhere where a connection is to be made between any form of fitting and the inside of a pipe carrying fluid.

By using a simple compressible grummet 1 which can be placed through an aperture 3 in the pipe 4 and will then expand to locate itself on the aperture, with a flange projection 8 and 10 one on each side of the aperture 5, a ready seal is provided into which the nipple can then be pushed, and as said by barbing or tapering the end of the nipple it is possible to ensure that the nipple will not be blown out by pressure because the size of the nipple will be such that the grummet will itself be kept under the required pressure to prevent leakage even under high pressures, and of course the flanged inner portion of the grummet will be forced hard against the inner wall of the pipe to ensure an effective seal.

To control flow of liquid from the pipe 4 through the hollow 14 of the nipple the inner end 15 of the nipple is sloped so that its opening can be turned to either face into the direction of flow in the pipe 4 or away from it or it can be medially located as shown in FIG. 3.

The nipple itself can be provided with an indicator 16 on its outer portion adjacent the outer face 10 of the grummet which can show the direction of the inclined inner end 15 of the nipple 6 when this is used, so that an operator by turning the nipple can either face the opening in the nipple into the direction of flow down the pipe, or if a lesser flow is required the nipple can simple be turned so that the opening faces downstream. In this way very effective control of flow can take place and it will be realised from the foregoing description that a simple and effective device is provided which can be readily inserted at any point by either simply drilling a hole of the required diameter in the pipe or providing an apertured pipe, such a unit being particularly useful for water reticulation in drip type feeds because a pipeline can be placed in position and the hole then drilled adjacent each of the trees which are to be watered and the nipple simply inserted and connected to the flow regulators.

Figure 4:
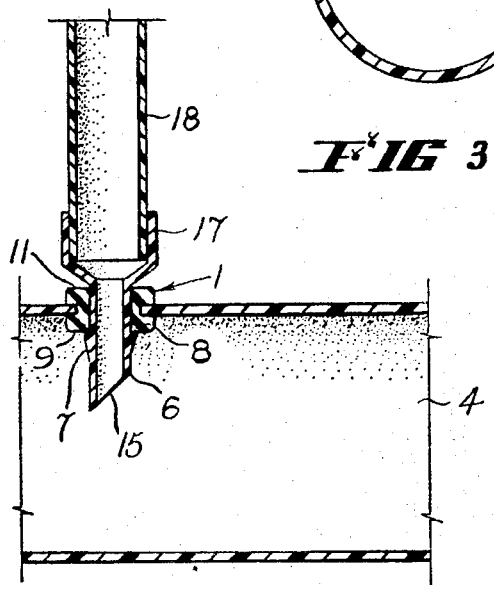
FIG. 4 shows a modification of the device in central section as fitted to a pipe.

In the form shown in FIG. 4, in which similar reference numerals are used for corresponding parts, the nipple 6 has an expanded portion 17 on it which engages a branch pipe 18.

What is claimed is:

1. A fluid outlet adapted to be inserted in a first aperture in a pipe having a fluid normally flowing therethrough, comprising:

a grummet including:
  a second aperture penetrating therethrough; and
  a groove disposed peripherally about said grummet intermediate its ends and engageable in said first aperture in said pipe;
a nipple having a longitudinally extending passageway and having an inner end and an outer end, said inner end being insertable through said second aperture in said grummet for locking said grummet in said first aperture in said pipe and providing an opening from said pipe; said nipple having an exterior sealing surface that sealingly engages the interior surface of said second aperture; said nipple having a tapered portion with a shoulder which passes through said second aperture in said grummet to have the shoulder engage the inner face of said grummet, said nipple having an outer shoulder means for engaging the outer face of the grummet whereby said nipple is operatively axially contained in said grummet and forces said grummet into contact with said first aperture to seal said first aperture excepting for flow through said passageway in said nipple; said nipple having means on the outer part of said nipple to engage flow conduit means, such as a hose to receive flow from the nipple; and
a partial flow control comprising having said nipple sealingly rotatable within said second aperture of said grummet and having a slope on said inner end of said nipple, whereby rotation of the said nipple controls volume of flow through the nipple by appropriately facing the slope into or out of the direction of flow; said partial flow control means including an indicator on said nipple outside of said grummet for indication of the direction with respect to the longitudinal axis of the pipe faced by the slope of the sloped inner end of said nipple.

2. A fluid outlet comprising:
a pipe adapted for having a fluid flowing therethrough;
a first aperture penetrating laterally through a side wall of said pipe;
a grummet having a peripheral groove intermediate its ends and sealingly engaged in said first aperture in said pipe, said grummet having a second aperture extending axially through same;
a nipple inserted through said second aperture in said grummet, said nipple having a longitudinally extending passageway and having a tapered portion with a shoulder which passes through the said aperture in the grummet to have the shoulder engage the inner face of the grummet, and a shoulder on said nipple to engage the outer face of the grummet, whereby the nipple is axially confined in the said grummet and forces the grummet into contact with the first aperture in the pipe to seal said first aperture excepting for flow through the passageway in the said nipple, said nipple having means on the outer part of said nipple to engage flow conduit means such as a hose to receive flow from the nipple; and
a partial flow control means comprising having said nipple sealingly rotatable within said aperture of said grummet and having on said inner end of said nipple a slope, whereby rotation of said nipple controls volume of flow through said nipple by appropriately facing the slope into, parallel with, or out of the direction of flow; said partial flow control means including an indicator on said nipple outside of said grummet for indication of the direction with respect to the longitudinal axis of the pipe faced by the slope of the sloped inner end of said nipple.

* * * * *